(12) United States Patent
Oh et al.

(10) Patent No.: US 12,301,281 B2
(45) Date of Patent: May 13, 2025

(54) METHOD AND APPARATUS FOR REGISTERING NEW TERMINAL USING CHROMATIC DISPERSION DISTANCE ESTIMATION

(71) Applicant: ELECTRONICS AND TELECOMMUNICATIONS RESEARCH INSTITUTE, Daejeon (KR)

(72) Inventors: Jung-yeol Oh, Sejong-si (KR); Hun Sik Kang, Daejeon (KR); Sang Rok Moon, Sejong-si (KR)

(73) Assignee: ELETRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 281 days.

(21) Appl. No.: 17/989,844

(22) Filed: Nov. 18, 2022

(65) Prior Publication Data

US 2023/0283369 A1    Sep. 7, 2023

(30) Foreign Application Priority Data

Mar. 3, 2022 (KR) .................. 10-2022-0027360

(51) Int. Cl.
*H04B 10/079* (2013.01)
(52) U.S. Cl.
CPC .............................. *H04B 10/07951* (2013.01)
(58) Field of Classification Search
CPC ............................................... H04B 10/07951
(Continued)

(56) References Cited

U.S. PATENT DOCUMENTS 7,633,866 B2    12/2009  Han et al.
10,523,323 B2   12/2019  Kang et al.
(Continued)

FOREIGN PATENT DOCUMENTS

CN    102113275 A  *  6/2011  ......... H04L 12/2869
JP    2009089323 A  *  4/2009
(Continued)

OTHER PUBLICATIONS

F. Devaux et al., "Simple Measurement of Fiber Dispersion and of Chirp Parameter of Intensity Modulated Light Emitter", Journal of Lightwave Technology, vol. 11, No. 12, Dec. 1993.

*Primary Examiner* — Amritbir K Sandhu
(74) *Attorney, Agent, or Firm* — LRK PATENT LAW FIRM

(57) ABSTRACT

Provided are a method and apparatus for registering a new terminal using chromatic dispersion distance estimation. The method of registering a new terminal, performed by a transport unit (TU), includes performing frame synchronization through a downstream packet received from a transport node (TN), identifying a position of a frequency of a spectral null and a number of frequencies of spectral nulls through analysis on a frequency spectrum of the received downstream packet, estimating a transmission distance of an optical fiber to the TN, based on the identified position of the frequency of the spectral null and the identified number of frequencies of spectral nulls, and determining a timing of transmitting a registration request message, based on the estimated transmission distance, where the discovery information message is received from the TN.

17 Claims, 7 Drawing Sheets

(58) Field of Classification Search
USPC .......................................................... 398/29
See application file for complete search history.

(56) References Cited

U.S. PATENT DOCUMENTS

| | | | |
|---|---|---|---|
| 2017/0244487 A1* | 8/2017 | Gao | H04B 10/272 |
| 2019/0319708 A1* | 10/2019 | Kang | H04B 10/07951 |
| 2020/0169273 A1* | 5/2020 | Moon | H03M 13/27 |
| 2020/0260164 A1 | 8/2020 | Geng et al. | |
| 2023/0283369 A1* | 9/2023 | Oh | H04B 10/079 |
| | | | 398/29 |

FOREIGN PATENT DOCUMENTS

| | | | | |
|---|---|---|---|---|
| JP | 2009-152915 A | 7/2009 | | |
| JP | 2013-258559 A | 12/2013 | | |
| JP | 6900624 B2 | 7/2021 | | |
| KR | 10-2018-0013889 A | 2/2018 | | |
| KR | 10-2019-0121022 A | 10/2019 | | |
| WO | WO-2007102303 A1 * | 9/2007 | ............. | H04B 10/27 |

* cited by examiner

METHOD AND APPARATUS FOR REGISTERING NEW TERMINAL USING CHROMATIC DISPERSION DISTANCE ESTIMATION

CROSS-REFERENCE TO RELATED APPLICATION

This application claims the benefit of Korean Patent Application No. 10-2022-0027360 filed on Mar. 3, 2022, in the Korean Intellectual Property Office, the entire disclosure of which is incorporated herein by reference for all purposes.

BACKGROUND

1. Field of the Invention

The present disclosure relates to a method and apparatus for registering a new terminal using chromatic dispersion distance estimation, and more particularly to, a method and apparatus for smoothly providing a low-latency service of a mobile communication network by reducing a time of detecting a new terminal through chromatic dispersion distance estimation in an optical transport network.

2. Description of Related Art

Optical transport networks are attracting the attention as representative technology for mobile communication networks, and one of the representative optical transport networks is a time division multiplexing (TDM)-based optical transport network. A TDM-based optical transport network employs a discovery window with an interval sufficient to detect a new terminal at a maximum separation distance for registration of a new terminal.

In this case, the TDM-based optical transport network may not allocate upstream resources in advance to detect a new terminal during a discovery window, so that other terminals do not generate upstream packets.

However, where an optical transport network accommodates a mobile communication network, latency caused by such a discovery window may be a great constraint in providing a low-latency service.

Accordingly, in recent years, there is a demand for a method of providing a shorter discovery window in order to provide a low-latency service in an optical transport network accommodating a mobile communication network.

SUMMARY

Example embodiments provide a method and apparatus for smoothly providing a low-latency service of a mobile communication network by reducing a time of detecting a new terminal through chromatic dispersion distance estimation in an optical transport network.

According to an aspect, there is provided a method of registering a new terminal, performed by a transport unit (TU), the method including: performing frame synchronization through a downstream packet received from a transport node (TN); identifying a position of a frequency of a spectral null and a number of frequencies of spectral nulls through analysis on a frequency spectrum of the received downstream packet; estimating a transmission distance of an optical fiber to the TN, based on the identified position of the frequency of the spectral null and the identified number of frequencies of spectral nulls; and determining a timing of transmitting a registration request message, based on the estimated transmission distance, where a discovery information message is received from the TN.

The identifying may include identifying the position of the frequency of the spectral null and the number of frequencies of spectral nulls by using a frequency response of the received downstream packet.

The identifying may include: setting a threshold of a spectral null proportional to a magnitude of received power with respect to the frequency response of the downstream packet; and determining, to be a spectral null, a minimum value of a section having a value lower than the set threshold.

The identifying may include determining the position of the frequency of the spectral nulls and the number of frequencies of spectral nulls by differentiating the frequency response of the downstream packet.

The transmission distance to the TN may be determined based on a relationship among a wavelength of an optical signal transmitted to the TN, a dispersion coefficient, an order of spectral nulls, and frequencies of the spectral nulls corresponding to the order of the spectral nulls.

The transmission distance to the TN may be determined through a lookup table including information about a transmission distance estimated according to the position of the frequency of the spectral null and the number of frequencies of spectral nulls.

The determining may include correcting the timing of transmitting the registration request message, through distance compensation using the estimated transmission distance and an optical fiber propagation delay time per unit distance.

According to an aspect, there is provided a method of registering a new terminal, performed by a transport node (TN), the method including: transmitting a discovery information message as a broadcast message through downstream to newly register a new terminal; opening a discovery window to receive a registration request message transmitted from the new terminal requesting a new registration, in response to the discovery information message; responding to the new terminal with a registration information message including an identifier of the new terminal, such as a device ID, in response to the registration request message received from the new terminal; and performing time synchronization between the TN and the new terminal through a process of measuring a distance to the new terminal. A timing of transmitting registration request message received from the new terminal to the TN may be determined by estimating a transmission distance of an optical fiber between the TN and the new terminal, based on a position of a frequency of a spectral null and a number of frequencies of spectral nulls, which are identified through an analysis on a frequency spectrum of a downstream packet.

The position of the frequency of the spectral null and the number of frequencies of spectral nulls may be determined by setting a threshold of a spectral null proportional to a magnitude of received power for a frequency response of the downstream packet and using a minimum value of a section having a value lower than the set threshold.

The position of the frequency of the spectral nulls and the number of frequencies of spectral nulls may be determined by differentiating a frequency response of the downstream packet.

The transmission distance between the TN and the new terminal may be determined based on a relationship among a wavelength of an optical signal transmitted to the TN, a dispersion coefficient, an order of spectral nulls, and frequencies of the spectral nulls corresponding to the order of the spectral nulls.

The transmission distance between the TN and the new terminal may be determined through a lookup table including information about a transmission distance estimated according to the position of the frequency of the spectral null and the number of frequencies of spectral nulls.

According to an aspect, there is provided an apparatus for registering a new terminal corresponding to a transport unit (TU), including a processor. The processor may be configured to perform frame synchronization through a downstream packet received from a transport node (TN), identify a position of a frequency of a spectral null and a number of frequencies of spectral nulls through an analysis on a frequency spectrum of the received downstream packet, estimate a transmission distance of an optical fiber to the TN based on the identified position of the frequency of the spectral null and the identified number of frequencies of spectral nulls, and determine a timing of transmitting a registration request message based on the estimated transmission distance, where a discovery information message is received from the TN.

The processor may be configured to identify the position of the frequency of the spectral null and the number of frequencies of spectral nulls by using a frequency response of the received downstream packet.

The processor may be configured to set a threshold of a spectral null proportional to a magnitude of received power with respect to the frequency response of the downstream packet and determine, to be a spectral null, a minimum value of a section having a value lower than the set threshold.

The processor may be configured to determine the position of the frequency of the spectral null and the number of frequencies of spectral nulls by differentiating the frequency response of the downstream packet.

The transmission distance to the TN may be determined based on a relationship among a wavelength of an optical signal transmitted to the TN, a dispersion coefficient, an order of spectral nulls, and frequencies of spectral nulls corresponding to the order of the spectral nulls.

The transmission distance to the TN may be determined through a lookup table including information about a transmission distance estimated according to the position of the frequency of the spectral null and the number of frequencies of spectral nulls.

The processor may be configured to correct the timing of transmitting the registration request message, through distance compensation using the estimated transmission distance and an optical fiber propagation delay time per unit distance.

Additional aspects of example embodiments will be set forth in part in the description which follows and, in part, will be apparent from the description, or may be learned by practice of the disclosure.

According to example embodiments, the present disclosure may smoothly provide a low-latency service of a mobile communication network by reducing a time of detecting a new terminal through chromatic dispersion distance estimation in an optical transport network.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
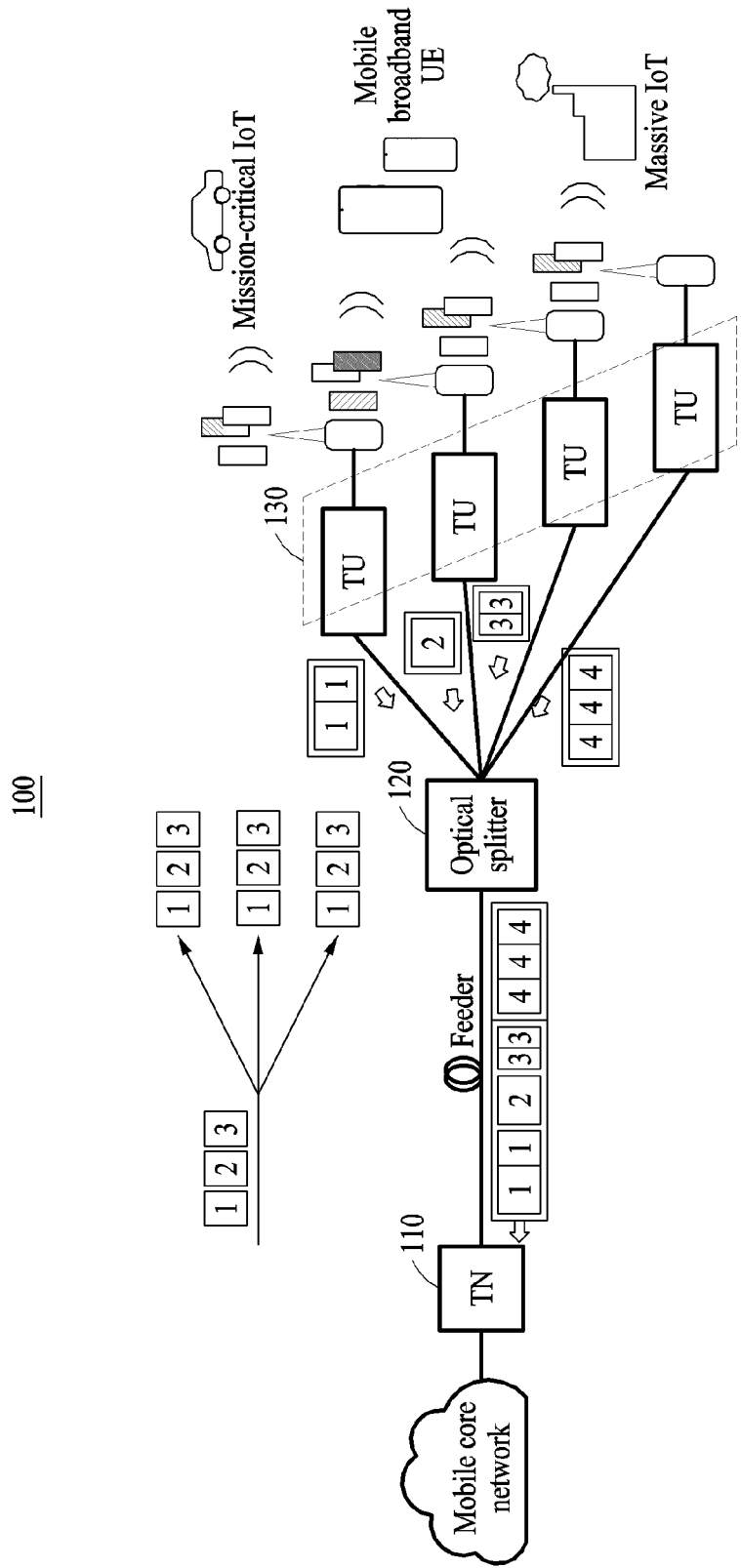
FIG. 1 is a diagram illustrating an optical transport network accommodating a mobile communication network, according to an example embodiment.

FIG. 1 is a diagram illustrating an optical transport network accommodating a mobile communication network, according to an example embodiment.

FIG. 1 illustrates a representative structure of a time division multiplexing (TDM)-based optical transport network providing a mobile communication network. More specifically, a transport node (TN) 110 of a TDM-based optical transport network 100 accommodating a mobile communication network may be connected to a plurality of transport units (TU) through an optical splitter 120 and thus provide a data service in a point to multi-point (P2MP) distribution network method.

In this case, downstream of the TDM-based optical transport network 100 may transmit packets with the same TN 110 to the plurality of TUs 130 according to a broadcast method, and upstream of the TDM-based optical transport network 100 may transmit each packet since the TN 110 schedules a transmission band for one or more TUs 130 according to a TDM method to share resources of the upstream.

Figure 2:
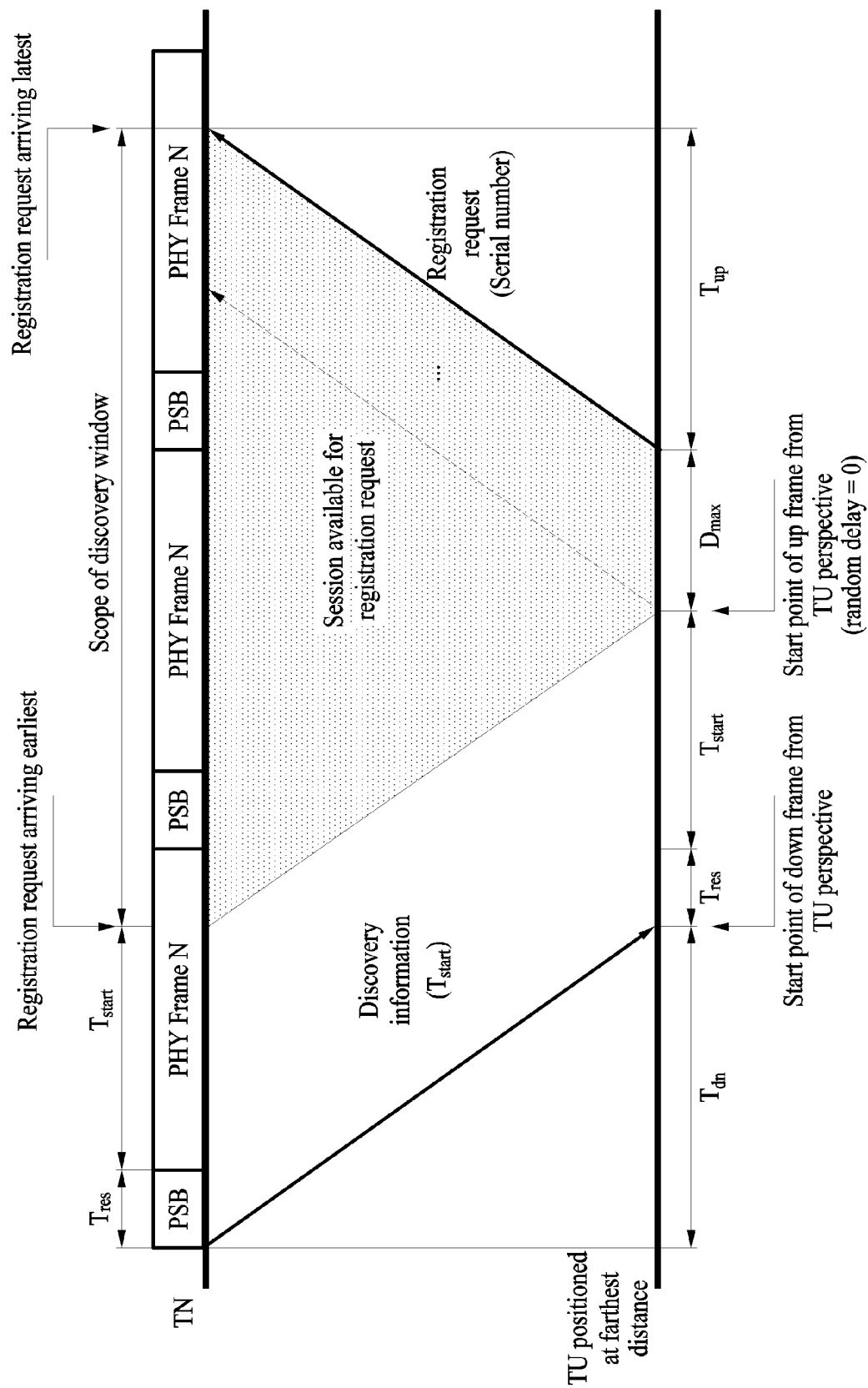
FIG. 2 is a conceptual diagram illustrating a process of registering a new terminal according to a conventional method performed by a transport unit and transport node of an optical transport network accommodating a mobile communication network.

In this case, the TN 110 may use a discovery window as shown in FIG. 2, where there is need to detect and register a new TU, that is, a new terminal, other than the TUs 130 currently being connected.

FIG. 2 is a flowchart illustrating a conventional process of registering a new terminal, performed by a TN of an optical transport network accommodating a mobile communication network.

① First, where power applies to a new TU, that is, a new terminal, other than TUs 130 included in an optical transport network 100, the new terminal may enter an initial state and perform frame synchronization through a downstream packet transmitted from a TN 110.

②The TN 110 included in the optical transport network 100 may periodically transmit a discovery information message through downstream in order to discover a terminal to be newly registered.

③Among the TUs 130 receiving the discovery information message, a new terminal, which is a TU not registered with the TU 110, may transmit a registration request message including a serial number of the new terminal and the like to be registered with the TU 110.

In this case, a time ($t_{req}$) of transmitting the registration request message may be determined through Equation 1 below.

$$t_{req}=t_{disc}+T_{res}+T_{start}+d_{rand} \quad \text{[Equation 1]}$$

Here, $t_{disc}$ may denote a time when the new terminal receives the discovery information message, $T_{req}$ may denote a response time that is a time required for the new terminal to prepare the registration request message after receiving the discovery information message, $T_{start}$ may denote a start time of upstream included in the discovery information message, and $d_{rand}$ may denote a random delay time used for a plurality of TUs to transmit upstream packets at the same time to prevent collision.

In this case, the TN 110 may open a discovery window to receive the registration request message transmitted from the new terminal. In this manner, the TUs 130 that have already been registered during a period of the opened discovery window may not generate an upstream packet and only the new terminal may transmit the registration request message to the TU 110 for the registration of the new terminal.

At this time, the size ($T_{window}$) of the discovery window opened by the TN 110 may be as Equation 2 below.

$$T_{window}=T_{dn}+D_{max}+T_{var}+T_{up} \quad \text{[Equation 3]}$$

Here, $T_{dn}$ and $T_{up}$ may denote a maximum propagation delay time of downstream and upstream, respectively, $T_{var}$ may denote a minimum response time variation, and $D_{max}$ may denote a maximum value of a random delay time.

④When the TN 110 receives the registration request message from the new terminal, the TN 110 may respond to the new terminal with a registration information message including an identifier of the new terminal, such as a device ID, through a downstream packet.

⑤When the new terminal receives the registration information message from the TN 110, the new terminal may store its device ID and the TN 110 may complete a process of registering the new terminal by performing time synchronization between the TN 110 and the new terminal through a process of measuring a distance of the new terminal newly discovered.

Such a conventional process of registering the new terminal may provide a time interval sufficient to receive the registration request from the new terminal having a maximum separation distance from the TN 110.

Therefore, where the optical transport network 100 accommodates a mobile communication network as shown in FIG. 1, the greater the discovery window, the more problematic it may be in providing a low-latency service due to latency generated by the discovery window.

Therefore, the present disclosure may estimate a relative distance between the TN 110 and a new TU, that is, the new terminal, by using chromatic dispersion generated in the TDM-based optical transport network 100 accommodating a mobile communication network and may provide a method of effectively reducing latency generated when the new terminal is detected by correcting the estimated relative distance.

Figure 3:
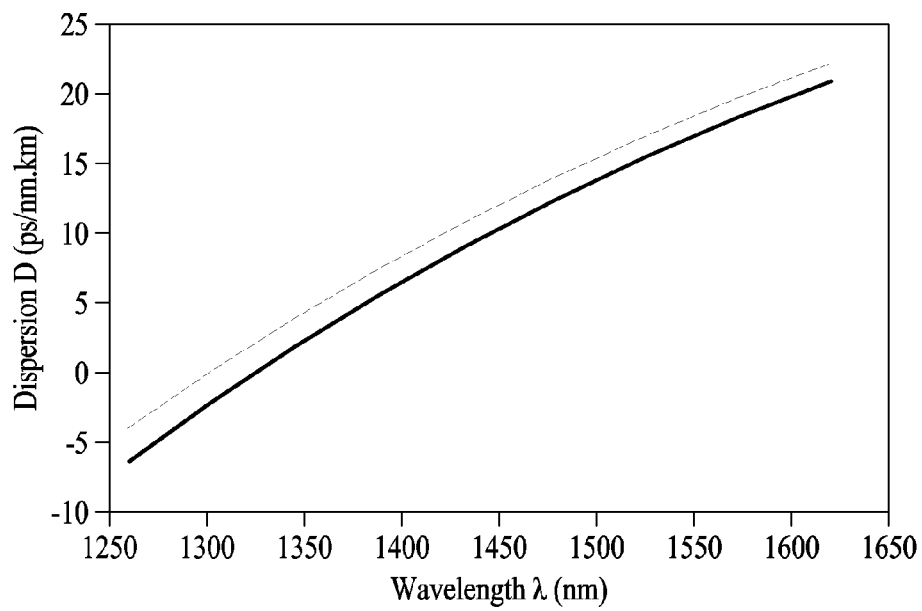
FIG. 3 is a diagram illustrating a chromatic dispersion coefficient according to a wavelength of a single-mode optical fiber, according to an example embodiment.

FIG. 3 is a diagram illustrating a chromatic dispersion coefficient according to a wavelength of a single-mode optical fiber, according to an example embodiment.

In the case of an optical fiber as an optical transmission medium in a TDM-based optical transport network 100, chromatic dispersion occurs where a transmission speed varies depending on a frequency of an optical signal. Such chromatic dispersion of the optical fiber may have a feature proportional to a wavelength of a light source spectrum and a transmission distance of an optical cable.

In an example, FIG. 3 may illustrate a chromatic dispersion coefficient according to a wavelength of a G.652 optical fiber, which is a generally-used single-mode optical fiber. More specifically, a chromatic dispersion coefficient may be about 17 ps/nm·km at 1550 nm of a C-band and reach 0 ps/nm·km at 1310 nm of an O-band. That is, where the C-band is used for downstream of the optical transport network 100, chromatic dispersion of about 340 ps/nm may occur in a 20 km optical cable. In this case, the broken line may indicate a maximum value of chromatic dispersion and the solid line may indicate a minimum value of chromatic dispersion.

Figure 4A:
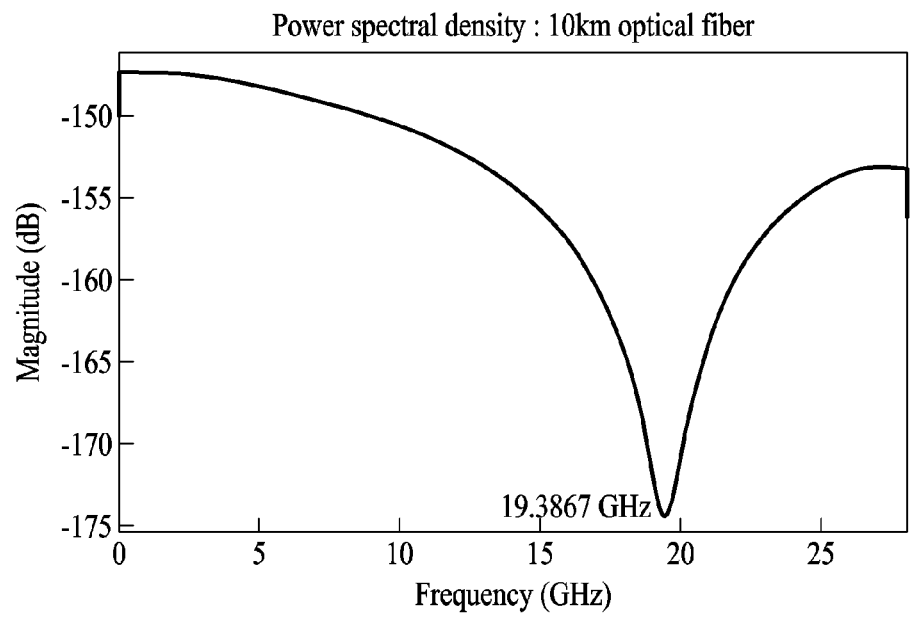
FIGS. 4A and 4B are a diagram illustrating a color dispersion effect according to a transmission distance of a power frequency spectrum, according to an example embodiment.
Figure 4B:
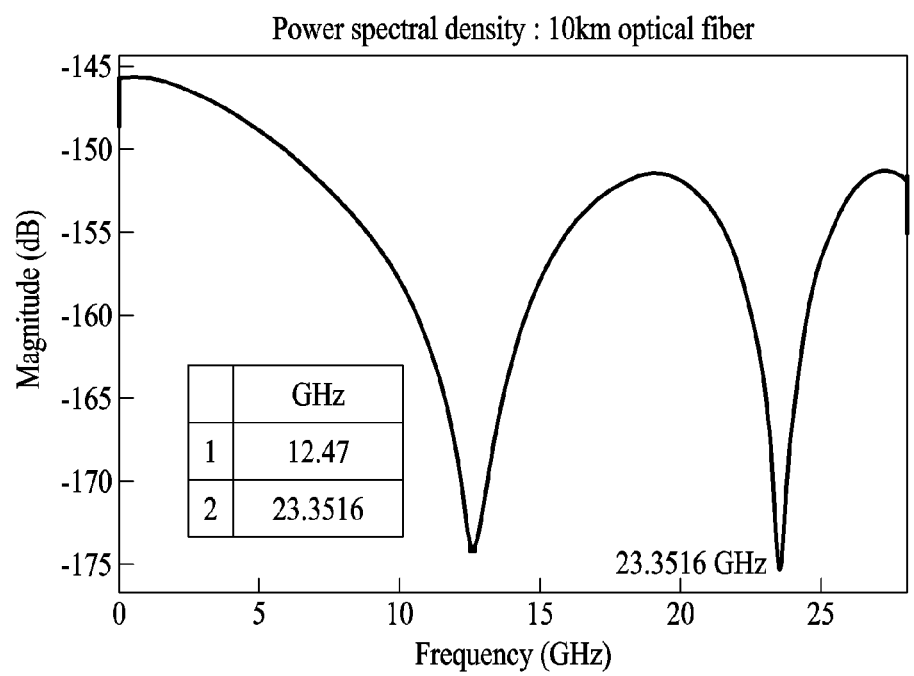

FIGS. 4A and 4B are a diagram illustrating a chromatic dispersion effect according to a transmission distance of a power frequency spectrum, according to an example embodiment.

A frequency spectrum of optical communication of intensity modulation & direct-detection (IM-DD) used in optical communication may have a power fading phenomenon in which positions of nulls in the frequency spectrum and the number of nulls in the frequency spectrum may change due to chromatic dispersion according to a transmission distance.

In an example, FIG. 4A is a diagram illustrating a chromatic dispersion effect of a power frequency spectrum, where a transmission distance is 10 km and, in the power frequency spectrum with a signal bandwidth of 28 GHz, one spectral null may occur at 19.4 GHz.

In addition, FIG. 4B is a diagram illustrating a chromatic dispersion effect of a power frequency spectrum, where a transmission distance is 20 km and, in the power frequency spectrum with a signal bandwidth of 28 GHz, two spectral nulls may occur at 12.47 GHz and 23.3526 GHz, respectively.

Therefore, by analyzing a frequency response of the optical signal in which chromatic dispersion occurs, the transmission distance of the single-mode optical fiber may be estimated as shown in Equation 3 below.

$$\hat{L} = \frac{c}{2\lambda^2 Df_u^2}(1+2u) \quad \text{[Equation 3]}$$

Here, $\hat{L}$ may denote an estimated value of a transmission distance, $\lambda$ may denote a wavelength of an optical signal, D may denote a dispersion parameter, may denote a frequency of a $u^{th}$ spectral null, c may denote the speed of light, and $f_u$ may denote an order of spectral nulls (u=0, 1, 2, . . . ).

The present disclosure may estimate a transmission distance of the estimated single-mode optical fiber as described above, that is, a relative distance between a TN 110 and a new terminal, and perform a distance compensation through the estimated relative distance for the new terminal positioned at a long distance at the time of registering the new terminal. In such a manner, the present disclosure may provide a method of reducing the size of the discovery window opened by the TN 110.

Figure 5:
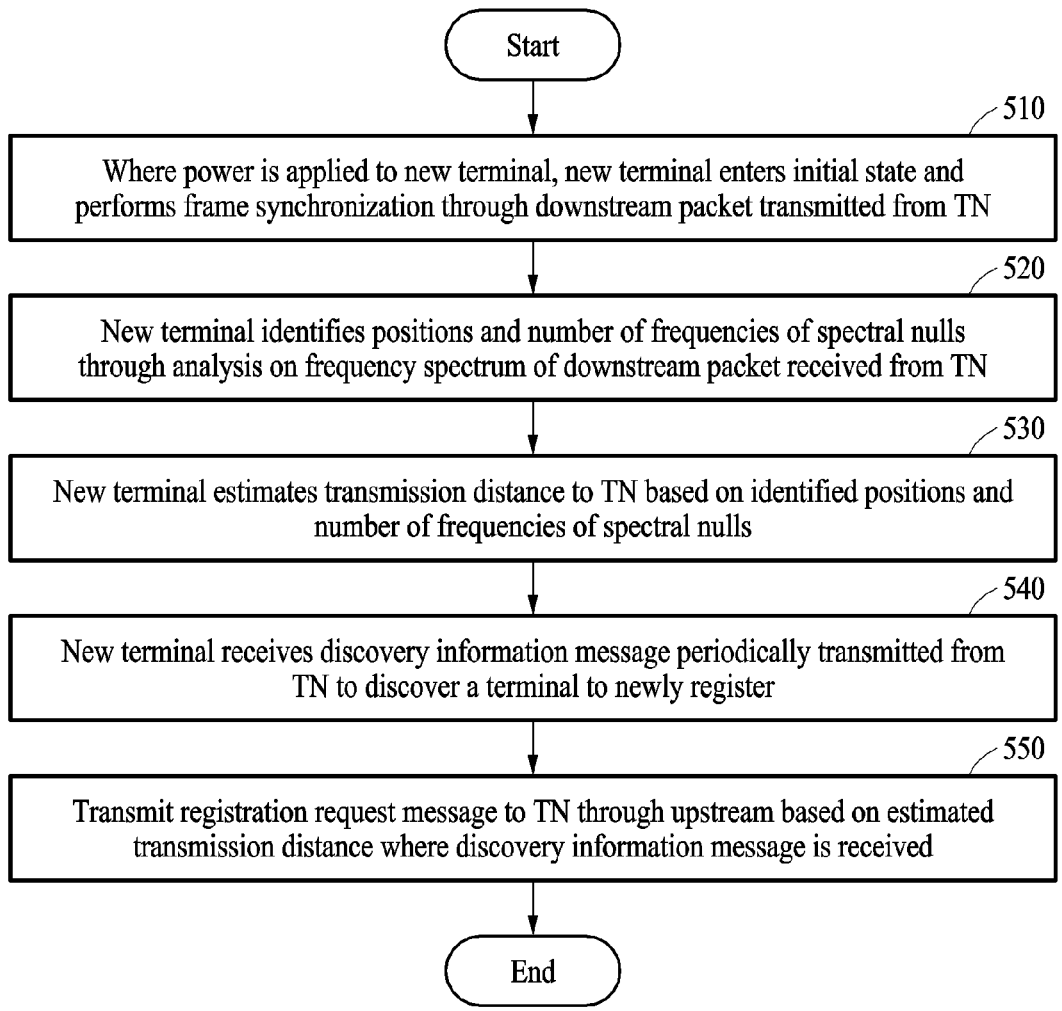
FIG. 5 is a flowchart illustrating a process of registering a new terminal, performed by a transport unit of an optical transport network accommodating a mobile communication network, according to an example embodiment.
Figure 6:
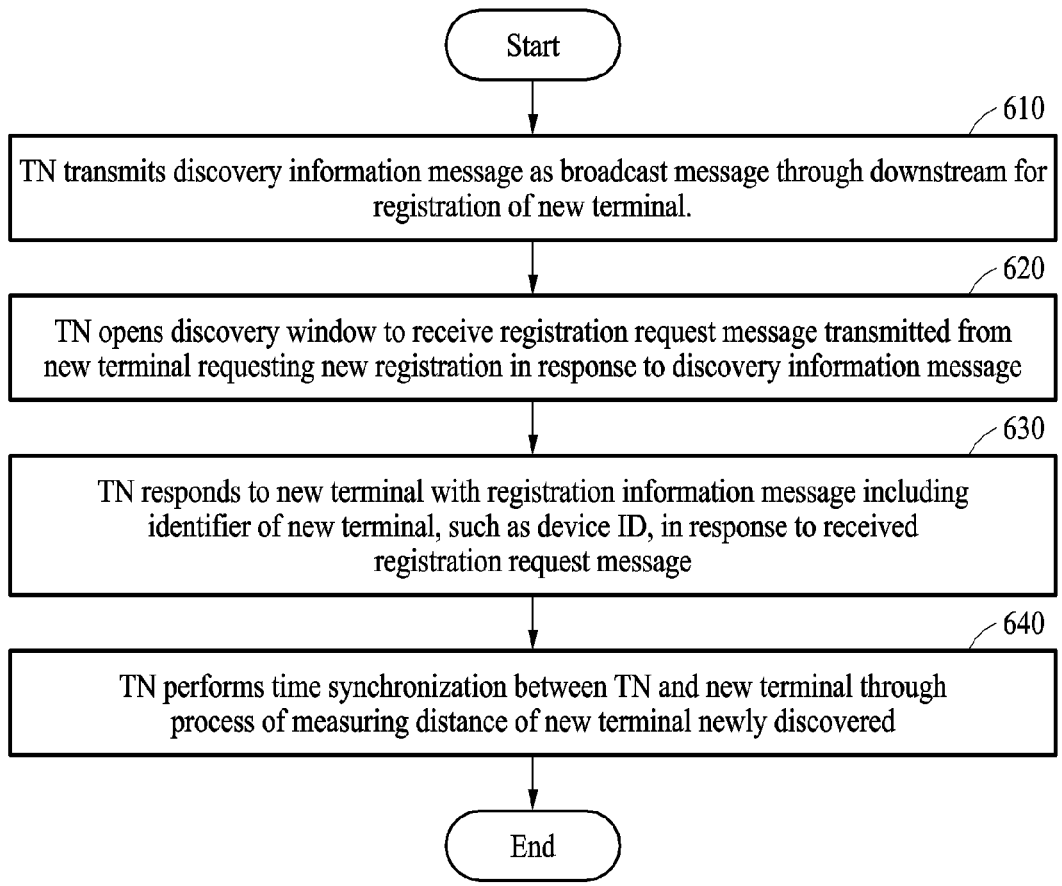
FIG. 6 is a flowchart illustrating a process of registering a new terminal performed by a transport node of an optical transport network accommodating a mobile communication network, according to an example embodiment.
Figure 7:
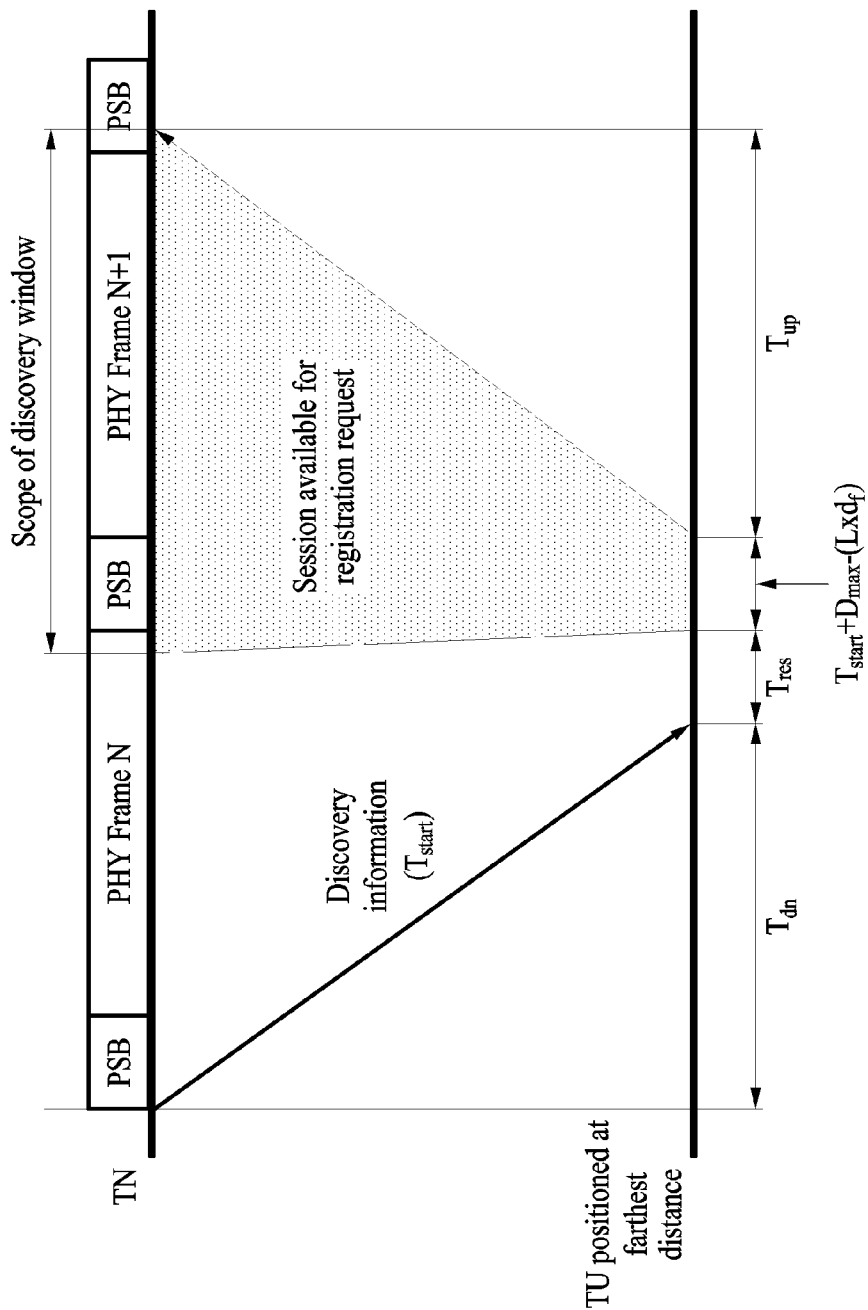
FIG. 7 is a diagram illustrating a process of registering a new terminal, performed by an optical transport network accommodating a mobile communication network, according to an example embodiment.

FIGS. 5 and 6 are flowcharts illustrating a process of registering a new terminal, performed by a TU and a TN of an optical transport network accommodating a mobile communication network, respectively, according to an example embodiment, and FIG. 7 is a conceptual drawing illustrating a process of registering a new terminal, performed by a TU and a TN, according to a method of the present disclosure.

FIG. 5 is a flowchart illustrating a process of registering a new terminal, performed by a TU of an optical transport network accommodating a mobile communication network, according to an example embodiment.

In operation 510, where power is applied to a new TU, that is, a new terminal, other than TUs 130 included in an optical transport network 100, the new terminal may enter an initial state and perform frame synchronization through a downstream packet transmitted from a TN 110. In this case, the downstream packet transmitted from the TN 110 may have a preamble header for the new terminal to obtain frame synchronization, perform the frame synchronization using the preamble header, and restore data of downstream.

In operation 520, the new terminal may identify a position of a frequency of a spectral null and a number of frequencies of spectral nulls based on analysis on the frequency spectrum of the downstream packet received from the TN 110. In this case, the new terminal may perform an analog to digital conversion for processing an electrical signal of the received downstream packet and then perform a frequency conversion, thus obtaining a frequency response. In this case, the frequency response of the received downstream packet may be obtained by the frequency conversion, such as a fast Fourier transform (FFT).

The new terminal may identify the position of the frequency of the spectral null and the number of frequencies of spectral null. For example, the new terminal may set a threshold of a spectral null proportional to the magnitude of received power with respect to the frequency response of the downstream packet and determine, to be a spectral null, a minimum value of a section having a value lower than the set threshold value. In another example, the new terminal may differentiate the frequency response of the downstream packet to determine the position of the frequency of the spectral null and the number of frequencies of spectral nulls.

In operation 530, the new terminal may estimate a transmission distance of an optical fiber to the TN 110, based on the identified position of the frequency of the spectral null and the number of frequencies of spectral nulls. More specifically, the new terminal may determine the transmission distance of the optical fiber to the TN 110, based on a relationship among a wavelength of an optical signal transmitted to the TN 110, a dispersion coefficient, an order of spectral nulls, and frequencies of the spectral nulls corresponding to the order of the spectral nulls.

In other words, the new terminal may estimate the transmission distance to the TN 110 by inputting the identified position of the frequency of the spectral null and the number of frequencies of spectral nulls to Equation 3 above. In this case, the new terminal may estimate the transmission distance with a greater reliability, using a statistical method by analyzing a downstream packet received for a certain period of time.

Alternatively, the new terminal may estimate the transmission distance to the TN 110 more rapidly, using a lookup table including information about the transmission distance estimated according to the position of the frequency of the spectral null and the number of frequencies of spectral nulls.

In operation 540, the new terminal may receive a discovery information message periodically transmitted by the TN 110 to discover a terminal to be newly registered. The discovery information message may be a broadcast message transmitted to all TUs and may include information about a message type and a start time. In this case, a terminal already registered may not make any response, in order for the new terminal to be registered, even where the terminal already registered receives the discovery information massage transmitted by the TN 110.

In operation 550, where the new terminal receives the discovery information message, the new terminal may transmit a registration request message to the TN 110 through upstream, based on the transmission distance estimated in operation 430.

More specifically, where the new terminal receives the discovery information message from the TN 110 after the estimation of the distance to the TN 110 is completed, the new terminal may transmit, to the TN 110, a registration request message including a serial number of the new terminal and the like through the upstream.

In this case, a timing ($t_{req}$) at which the new terminal transmits the registration request message to the TN 110 may be determined by the following Equation 4.

$$t_{req} = t_{disc} + T_{res} + T_{start} + d_{rand} - (\hat{L} \times d_f)$$ [Equation 4]

Here, $t_{disc}$ may denote a time when the new terminal receives the discovery information message, $T_{req}$ may denote a response time that is the time required for the new terminal to prepare the registration request message after receiving the discovery information message, $T_{start}$ may denote a start time of upstream included in the discovery information message, $d_{rand}$ may denote a random delay time, $\hat{L}$ may denote an estimate of the transmission distance by optical fiber between the new terminal and the TN 110, and $d_f$ may denote a propagation delay time of the optical fiber per unit distance.

Latency according to the transmission distance of the new terminal may be reduced since the new terminal of the present disclosure corrects a time according to an estimation result of the distance between the new terminal and the TN 110 as illustrated in Equation 4 and then transmits the registration request message to the TN 110.

FIG. 6 is a flowchart illustrating a process of registering a new terminal, performed by a TN of an optical transport network accommodating a mobile communication network, according to an example embodiment.

In operation 610, a TN 110 may transmit a discovery information message as a broadcast message through downstream for registration of a new terminal.

In operation 620, the TN 110 may open a discovery window to receive a registration request message transmitted from the new terminal requesting new registration in response to the discovery information message. As mentioned above, the transmission distance between the TN node 110 and the new terminal may be estimated based on a position of a frequency of a spectral null and the number of frequencies of spectral nulls identified through the frequency response of the downstream packet. In the registration request message, the transmission timing from the new terminal to the TN 110 may be determined according to the estimated transmission distance. Therefore, the size ($T_{window}$) of the discovery window of the TN 110 may be determined by Equation 3 below.

$$T_{window} = T_{dn} + D_{max} + T_{var}$$ [Equation 3]

Here, $T_{dn}$ may denote a maximum propagation delay of downstream, $T_{var}$ may denote a minimum response time variation, and $D_{max}$ may denote a maximum value of a random delay time. That is, since the new terminal transmits the registration request message to the TN 110 by correcting the time according to the estimation result of the transmission distance to the TN 110, the size of the discovery window may be reduced by as much as the maximum propagation delay time of upstream ($T_{up}$), compared to an existing size of the discovery window. For example, where the maximum transmission distance is 20 km, the maximum propagation delay time of the upstream ($T_{up}$) is 100 μs, and the size of the discovery window may be reduced by 100 μs, compared to the existing size of the discovery window.

In operation 630, the TN 110 may respond to the new terminal with a registration information message including an identifier of the new terminal, such as a device ID, in response to the received registration request message. In this case, the new terminal receiving the registration information message may store its device ID.

Finally, in operation 640, the TN 110 may perform time synchronization between the TN 110 and the new terminal through a process of measuring the distance of the new terminal newly discovered. In this case, where the time synchronization between the TN 110 and the new terminal is completed, the process of registering the new terminal, performed by the TN 110, may be completed.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductive wire memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single example embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A method of registering a new terminal, performed by a transport unit (TU), the method compressing:
   performing frame synchronization through a downstream packet received from a transport node (TN);
   identifying a position of a frequency of a spectral null and a number of frequencies of spectral nulls through analysis on a frequency spectrum of the received downstream packet;
   estimating a transmission distance of an optical fiber to the TN, based on the identified position of the frequency of the spectral null and the identified number of frequencies of spectral nulls; and
   determining a timing of transmitting a registration request message, based on the estimated transmission distance, where a discovery information message is received from the TN,
   wherein the determining comprises correcting the timing of transmitting the registration request message, through distance compensation using the estimated transmission distance and an optical fiber propagation delay time per unit distance.

2. The method of claim 1, wherein the identifying comprises identifying the position of the frequency of the spectral null and the number of frequencies of spectral nulls by using a frequency response of the received downstream packet.

3. The method of claim 2, wherein the identifying comprises:
   setting a threshold of a spectral null proportional to a magnitude of received power with respect to the frequency response of the downstream packet; and
   determining, to be a spectral null, a minimum value of a section having a value lower than the set threshold.

4. The method of claim 2, wherein the identifying comprises determining the position of the frequency of the spectral null and the number of frequencies of spectral nulls by differentiating the frequency response of the downstream packet.

5. The method of claim 1, wherein the transmission distance to the TN is determined based on a relationship among a wavelength of an optical signal transmitted to the TN, a dispersion coefficient, an order of spectral nulls, and frequencies of the spectral nulls corresponding to the order of the spectral nulls.

6. The method of claim 1, wherein the transmission distance to the TN is determined through a lookup table comprising information about a transmission distance estimated according to the position of the frequency of the spectral null and the number of frequencies of spectral nulls.

7. A method of registering a new terminal, performed by a transport node (TN), the method comprising:
   transmitting a discovery information message as a broadcast message through downstream to newly register a new terminal;
   opening a discovery window to receive a registration request message transmitted from the new terminal requesting a new registration, in response to the discovery information message;
   responding to the new terminal with a registration information message comprising an identifier of the new terminal, such as a device ID, in response to the registration request message received from the new terminal; and
   performing time synchronization between the TN and the new terminal through a process of measuring a distance to the new terminal,
   wherein a timing of transmitting the registration request message received from the new terminal to the TN is determined by estimating a transmission distance of an optical fiber between the TN and the new terminal, based on a position of a frequency of a spectral null and a number of frequencies of spectral nulls, which are identified through an analysis on a frequency spectrum of a downstream packet,
   wherein the timing of transmitting is corrected by distance compensation using an estimated transmission distance and an optical fiber propagation delay time per unit distance.

8. The method of claim 7, wherein the position of the frequency of the spectral null and the number of frequencies of spectral nulls are determined by setting a threshold of a spectral null proportional to a magnitude of received power for a frequency response of the downstream packet and using a minimum value of a section having a value lower than the set threshold.

9. The method of claim 7, wherein the position of the frequency of the spectral null and the number of frequencies of spectral nulls are determined by differentiating the frequency response of the downstream packet.

10. The method of claim 7, wherein the transmission distance between the TN and the new terminal is determined based on a relationship among a wavelength of an optical signal transmitted to the TN, a dispersion coefficient, an order of spectral nulls, and frequencies of the spectral nulls corresponding to the order of the spectral nulls.

11. The method of claim 7, wherein the transmission distance between the TN and the new terminal is determined through a lookup table comprising information about a transmission distance estimated according to the position of the frequency of the spectral null and the number of frequencies of spectral nulls.

12. An apparatus for registering a new terminal corresponding to a transport unit (TU), the apparatus comprising a processor,
   wherein the processor is configured to perform frame synchronization through a downstream packet received from a transport node (TN), identify a position of a frequency of a spectral null and a number of frequencies of spectral nulls through an analysis on a frequency spectrum of the received downstream packet, estimate a transmission distance of an optical fiber to the TN based on the identified position of the frequency of the spectral null and the identified number of frequencies of spectral nulls, and determine a timing of transmitting a registration request message based on the estimated transmission distance, where a discovery information message is received from the TN,
   wherein the processor is configured to correct the timing of transmitting the registration request message, through distance compensation using the estimated transmission distance and an optical fiber propagation delay time per unit distance.

13. The apparatus of claim 12, wherein the processor is configured to identify the position of the frequency of the spectral null and the number of frequencies of spectral nulls by using a frequency response of the received downstream packet.

14. The apparatus of claim 13, wherein the processor is configured to set a threshold of a spectral null proportional to a magnitude of received power with respect to the frequency response of the downstream packet and determine, to be a spectral null, a minimum value of a section having a value lower than the set threshold.

15. The apparatus of claim 13, wherein the processor is configured to determine the position of the frequency of the spectral nulls and the number of frequencies of spectral nulls by differentiating the frequency response of the downstream packet.

16. The apparatus of claim 12, wherein the transmission distance to the TN is determined based on a relationship among a wavelength of an optical signal transmitted to the TN, a dispersion coefficient, an order of spectral nulls, and frequencies of spectral nulls corresponding to the order of the spectral nulls.

17. The apparatus of claim 12, wherein the transmission distance to the TN is determined through a lookup table comprising information about a transmission distance estimated according to the position of the frequency of the spectral null and the number of frequencies of spectral nulls.

* * * * *